Sept. 24, 1968

J. SELZER 3,402,539

CORNPICKER SAFETY DEVICE

Filed Oct. 23, 1965

INVENTOR.
John Selzer
BY
Frederick Staub
Atty.

Sept. 24, 1968 J. SELZER 3,402,539
CORNPICKER SAFETY DEVICE
Filed Oct. 23, 1965 2 Sheets-Sheet 2
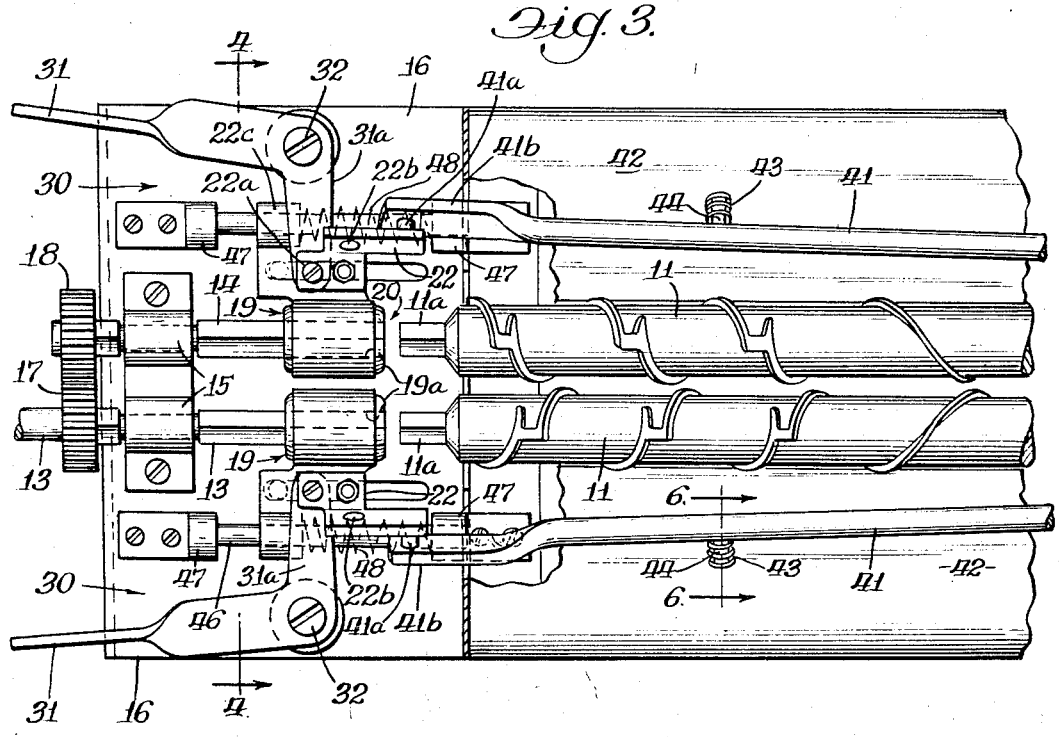
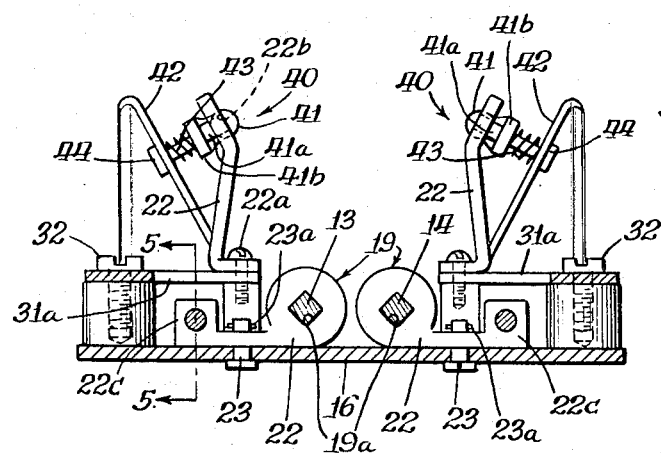
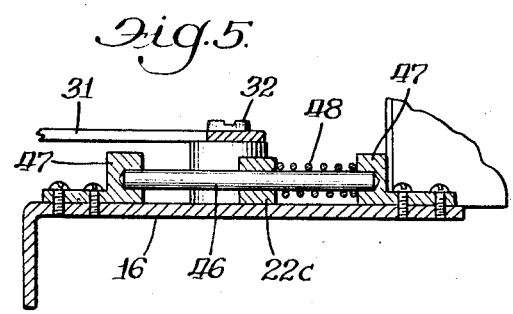
INVENTOR.
John Selzer
BY
Frederick J. Hauber
Atty.

United States Patent Office 3,402,539
Patented Sept. 24, 1968

3,402,539
CORNPICKER SAFETY DEVICE
John Selzer, Fort Wayne, Ind., assignor to International Harvester Company, Chicago, Ill., a corporation of Delaware
Filed Oct. 23, 1965, Ser. No. 503,930
4 Claims. (Cl. 56—104)

This invention relates to a new and improved device for averting and reducing injury to persons and things in the operation of cornpickers of well-known type and particularly to cornpickers employing a plurality of snapping rolls in relatively closely spaced relation with one another, as for example in Aasland Patent No. 2,881,579 of Apr. 14, 1959.

An important object of the invention is to provide means readily accessible to a person suffering the misfortune of having part of his body or clothing caught between the rotating snapping rolls of a cornpicker whereby the operation of the rolls can be handily and quickly stopped and serious injury averted.

A further object of the invention is to provide means so accessible for operation instantly to disconnect such rolls from their power source whereby speedily to stop rotation of them and enable prompt extrication of body, apparel, or other matter, as the case may be.

Other important objects of the invention will appear from the description which follows in connection with the accompanying drawings, in which FIG. 1 is a fragmentary plan view of a cornpicker embodying the invention;

FIG. 3 is another fragmentary, enlarged plan view of the parts shown in FIG. 2, partially broken away, and illustrating an embodiment of the invention in operated position;

FIG. 4 is a sectional view along the line 4—4 of FIG. 3;

FIG. 5 is a sectional view along the line 5—5 of FIG. 4;

FIG. 6 is a sectional view along the line 6—6 of FIG. 3.

Figure 1:
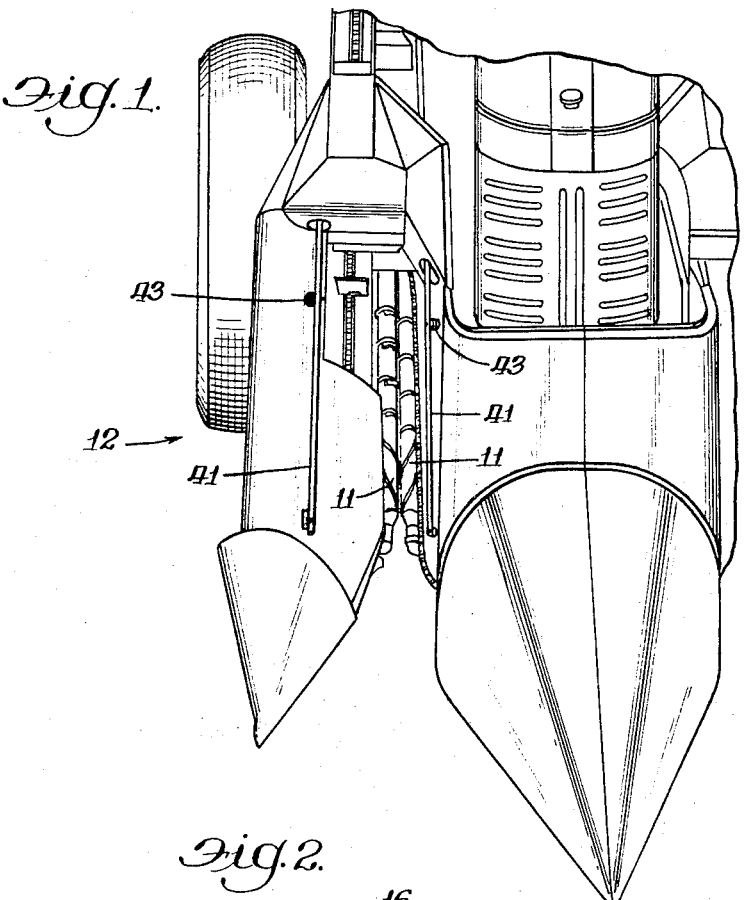

Referring to the drawings, the snapping rolls 11 of the power operated cornpicker 12 are detachably mounted for opposed, downwardly converging rotation about generally horizontal longitudinal axes coaxial with shafts 13, 14, which are rotatably supported in bearings 15 carried on frame 16 of the cornpicker; shaft 13 in the form illustrated being driven from a source of power (not shown) on the implement and shaft 14, by gears 17, 18 driven from shaft 13.

Shafts 13, 14, which extend forwardly of the implement in generally parallel spaced relation with the longitudinal axis thereof, are generally rectangular in cross-section adjacent their forward extremities and carry sleeves or members 19 in axial slidable relation; said sleeves forming the movable elements of clutch assemblies 20 for connecting, and disconnecting shafts 13, 14 and rolls 11.

Sleeves 19 are journalled for rotation in bearings 21 formed in brackets 22, which are mounted on frame 16 in adjustable, slidable relation therewith, and having pins 23 arranged in operative sliding arrangement with slots 24 provided in frame 16; pins 23 being provided with cotters 23a spanning the slots and restricting relative vertical movement of brackets 22 (FIG. 5) and bearings 21. Longitudinal movement of sleeves 19 relative to bearings 21 is restricted by collars 19a adjacent the extremities of the sleeves.

Sleeves 19 have a generally rectangular bore 19a adapted to receive for rotation in unison therewith in opposed, coaxial relation and therefore to connect shafts 13, 14 and cooperative stub shafts 11a provided on snapping rolls 11, which are suitably supported in well-known manner on frame 16.

Sleeves 19 are operable to connect and disconnect shafts 13, 14 and 11a by a manually operable shift assembly 30 comprising angulated shift levers 31 mounted intermediately thereof on pins 32 for pivotal movement about the generally vertical axes thereof; pins 32 being mounted on frame 16 in opposed spaced relation with one another; and converging arms 31a of the levers pivotally engaging bolts 22a on brackets 22.

Figure 2:
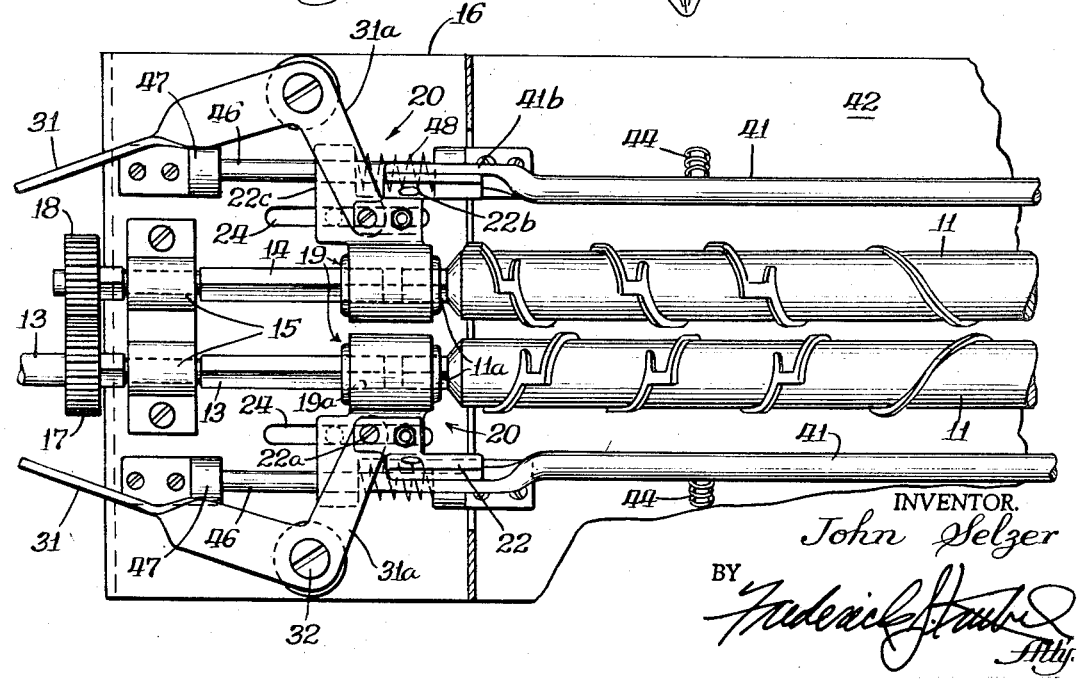
FIG. 2 is a fragmentary, enlarged plan view of a portion of the device shown in FIG. 1, partially broken away, and illustrating snapping rolls in operative position.

Shift assembly 30, sleeves 19, and their associated parts are so conformed and arranged to operate that when the levers 31 are in the position illustrated in FIG. 2, snapping rolls 11 are in operative position for rotation; in the position of FIG. 3, disconnected and inoperative.

Emergency operation of shift assembly 30 from the position of FIG. 2 to the position of FIG. 3 is provided by a dual safety mechanism comprising identical emergency shift assemblies 40 on opposite sides of the cornpicking unit comprising the snapping rolls 11, but one of which need be described, as these mechanisms are alike in structure and operation.

In order to facilitate emergency operation of shift assembly 30, rods 41 arranged in readily accessible, generally parallel, variable spaced relation with one another and with snapping rolls 11, are pivotally mounted in well-known manner adjacent one end thereof on frame 16 and spring-biased (FIGS. 3, 6) from housing 42 of the implement by spring 43 carried on bolt 44 slidable in a bore 45 in the housing and threaded into rod 41. This rod carries a pin 41a adjacent its rearward extremity 41b, which is shaped as illustrated in FIGS. 2, 3 and 4, and arranged for latching engagement of pin 41a in a hole 22b provided in bracket 22, whereby releasably to retain bracket 22 and its associated parts in the position of FIG. 2 under the bias of spring 43.

Bracket 22 has an upstanding portion 22c having a base 22d for receiving a stationary shaft 46 in slidable relation; shaft 46 being supported adjacent its extremities in supports 47 on frame 16 in parallel spaced relation with shafts 13, 14. Shaft 46 carries a spring 48 intermediately of bracket portion 22c and one of the supports 47 and is so arranged as sharply to bias bracket 22 in one direction (to the left in FIG. 5) when the parts are in the position of FIG. 2 and pin 41a is received in hole 22b.

Thus, upon pressing rod 41 against the bias in spring 43 and releasing pin 41a from hole 22b, spring 48 will operate instantly to shift the proximate bracket 22 to shaft disconnected position of FIG. 3. The arrangement is such that when shift assembly 30 is operated from the position of FIG. 3 to the position of FIG. 2, spring 48 will be compressed and pin 41a will enter hole 22b in latching engagement therewith thereby effecting releasable detention of the parts in the position of FIG. 2.

It will be understood, as previously indicated, that the two emergency shift assemblies 40 operate alike, and that one or both may be operated at one time; one or both snapping rolls 11 being disconnected accordingly.

Rods 41, being in relatively close proximity to the snapping rolls, afford readily accessible emergency control means.

The invention thus provides a novel, simple and effective device for averting and reducing the likelihood of serious injury to person and property in the operation of a cornpicker.

Details of construction of the inventive embodiment which has been described may, of course, be varied without departing from the spirit and scope of the invention defined in the claims which follow.

I claim:
1. A safety device for a power operated cornpicker having a corn-picking assembly comprising a frame carrying
   a pair of cooperative snapping rolls arranged for opposed downwardly converging rotation about axes extending forwardly of the implement in generally parallel spaced relation with the longitudinal axis thereof and with one another,
   power operated means carried on said frame for so rotating said rolls,
   clutch assemblies arranged on said frame for operatively connecting said power operated means and said rolls so to rotate the latter, and disconnecting the same, under operator control, and respectively including a clutch member, shiftable for the purpose,
   said device comprising other means on said frame operatively connected with said clutch assemblies for disconnecting said power operated means and said rolls,
   said other means respectively including a latch assembly comprising spring means biasing said shiftable clutch member to position disconnecting the roll and the power operated means associated therewith, detent means operatively associated with said clutch member releasably to latch said clutch member in position of operation connecting said associated roll and said power operated means against the bias of said spring means,
   a safety control member operatively associated with said detent means and operable upon touch to release said detent means thereby to trigger said spring means to shift said clutch member and disconnect the roll and power operated means associated therewith.

2. A safety device according to claim 1 in which
   the shiftable clutch member comprises a sleeve carried by an upstanding bracket arranged on the frame in longitudinally slidable relation therewith,
   said spring means being arranged on said frame to bias said bracket and said clutch member toward inoperative position of the latter,
   said detent means comprise interengageable means on said bracket and said control member,
   and said control member is resiliently mounted on said frame and operative upon touch to disengage said detent means.

3. A safety device according to claim 2 in which the control member is spring biased to position for interengagement of said detent means, and the latch assembly and the parts associated therewith are so conformed and arranged to operate whereby upon operation of the clutch assemblies operatively to connect said power operated means and said rolls, said control member will operate under said spring bias to effect interengagement of said detent means.

4. A safety device according to claim 3 in which the control member is pivotally mounted adjacent one end thereof on said frame and in predetermined spaced relation with said detent means and is resiliently mounted intermediately thereof for limited adjustment relative to said frame, said control member being conveniently disposed in relation to the operative zone of said rolls for emergency operation.

References Cited

UNITED STATES PATENTS 2,618,113   11/1952   Hyman _____ 56—104

ROBERT E. BAGWILL, *Primary Examiner.*